United States Patent
Varnell

(10) Patent No.: US 10,372,051 B2
(45) Date of Patent: Aug. 6, 2019

(54) METHOD OF ENHANCING ADHESION OF LIQUID TONER PRINTED ON A SUBSTRATE, AND PRODUCTS THEREFROM

(71) Applicant: Solenis Technologies, L.P., Schaffhausen (CH)

(72) Inventor: Daniel F Varnell, Wilmington, DE (US)

(73) Assignee: SOLENIS TECHNOLOGIES, L.P., Schaffhausen (CH)

( * ) Notice: Subject to any disclaimer, the term of this patent is extended or adjusted under 35 U.S.C. 154(b) by 135 days.

(21) Appl. No.: 15/598,145

(22) Filed: May 17, 2017

(65) Prior Publication Data

US 2017/0336725 A1 Nov. 23, 2017

Related U.S. Application Data

(60) Provisional application No. 62/338,341, filed on May 18, 2016.

(51) Int. Cl.
| | |
|---|---|
| *B32B 3/02* | (2006.01) |
| *G03G 7/00* | (2006.01) |
| *C09D 5/00* | (2006.01) |
| *C09D 103/04* | (2006.01) |
| *C09D 123/08* | (2006.01) |
| *C09D 129/04* | (2006.01) |
| *C09D 133/02* | (2006.01) |
| *C09D 133/26* | (2006.01) |
| *C09D 139/06* | (2006.01) |
| *C09D 179/02* | (2006.01) |
| *G03G 9/125* | (2006.01) |

(52) U.S. Cl.
CPC ............ *G03G 7/0046* (2013.01); *C09D 5/002* (2013.01); *C09D 103/04* (2013.01); *C09D 123/0869* (2013.01); *C09D 129/04* (2013.01); *C09D 133/02* (2013.01); *C09D 133/26* (2013.01); *C09D 139/06* (2013.01); *C09D 179/02* (2013.01); *G03G 7/004* (2013.01); *G03G 7/008* (2013.01); *G03G 7/0026* (2013.01); *G03G 7/0033* (2013.01); *G03G 9/125* (2013.01)

(58) Field of Classification Search
CPC .. G03G 7/0046; G03G 7/0026; G03G 7/0033; C09D 139/06; C09D 129/04; C09D 133/02; C09D 133/26; C09D 179/02
See application file for complete search history.

(56) References Cited

U.S. PATENT DOCUMENTS

2007/0031615 A1 2/2007 Nair et al.

FOREIGN PATENT DOCUMENTS

| EP | 0747235 A2 | 12/1996 |
|---|---|---|
| WO | 02058929 A1 | 8/2002 |
| WO | 2013030784 | 3/2013 |
| WO | 2014160604 A1 | 10/2014 |
| WO | 2014160696 A1 | 10/2014 |

OTHER PUBLICATIONS

Patent Cooperation Treaty, International Search Report in Application No. PCT/US2017/033189, dated Aug. 1, 2017.
Alex Glassman, Printing Fundamentals, TAPPI Press, 1985.
Pulp & Paper Primer, 2nd Edition, TAPPI Press (1998) pp. 24-25 author David Saltman, et al.

*Primary Examiner* — Elizabeth E Mulvaney
(74) *Attorney, Agent, or Firm* — Lorenz & Kopf, LLP

(57) ABSTRACT

A method of improving the adhesion of a liquid ink to a substrate where the ink is applied to the substrate using an LEP printing process, and products therefrom.

16 Claims, No Drawings or methodologies set forth in the following description or
METHOD OF ENHANCING ADHESION OF LIQUID TONER PRINTED ON A SUBSTRATE, AND PRODUCTS THEREFROM

CROSS REFERENCE TO RELATED APPLICATIONS

This application claims the benefit under 35 U.S.C. 119(e) of U.S. Provisional Application No. 62/338,341 filed May 18, 2016. The entirety of which is hereby incorporated herein by reference.

FIELD

The presently disclosed process(es), procedure(s), method(s), product(s), result(s), and/or concept(s) (collectively referred to as the "present disclosure") relates generally to a method of enhancing adhesion of a liquid toner to at least one surface of a substrate, comprising: (i) treating a substrate with a composition comprising (a) a binder and (b) a binder additive, and (ii) liquid electrophotographic printing an image on the treated substrate using a liquid ink. More specifically, the binder additive can comprise a polymer produced from monomers selected from the group consisting of vinylpyrrolidone, an oxazoline-containing monomer, N-vinyl piperidinone, vinylcaprolactam, N,N-dimethyl acrylamide, and combinations thereof. The present disclosure also relates generally to a printed substrate produced by such a method.

BACKGROUND

Liquid electrophotographic (LEP) printing uses a liquid ink for printing on substrates rather than using a dry, powder toner. Common examples of LEP printing machines are the HP® digital Indigo™ printing presses. The toner particles in the liquid ink used in LEP printing are sufficiently small such that the LEP-printed images do not mask the underlying surface roughness/gloss of, for example, paper substrates. The liquid ink (also referred to herein as "ink", "liquid toner", or "LEP ink") used in LEP printing is a suspension of small pigment particles in the range of about 1 to 2 microns in a nonaqueous liquid. HP® ElectroInk® is a commonly used liquid ink for liquid electrophotographic printing. Pigment particles can mean pigment dispersed in polymer. LEP printing is considered to give some of the best digital print quality images at a relatively rapid speed.

However, it has been found that oftentimes LEP printed images will not adhere to substrates as well as images printed using electroreprographic printing methods that utilize a dry-toner process. Many of the issues with LEP printing are described in WO2013030784, which is hereby incorporated by reference herein in its entirety. Therefore, a need exists to enhance the adhesion of LEP ink on substrates via the LEP printing process.

DETAILED DESCRIPTION

Before explaining at least one embodiment of the present disclosure in detail, it is to be understood that the present disclosure is not limited in its application to the details of construction and the arrangement of the components or steps or methodologies set forth in the following description or illustrated in the drawings. The present disclosure is capable of other embodiments or of being practiced or carried out in various ways. Also, it is to be understood that the phraseology and terminology employed herein is for the purpose of description and should not be regarded as limiting.

Unless otherwise defined herein, technical terms used in connection with the present disclosure shall have the meanings that are commonly understood by those of ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference.

All of the articles and/or methods disclosed herein can be made and executed without undue experimentation in light of the present disclosure. While the articles and methods of the present disclosure have been described in terms of different embodiments, it will be apparent to those of ordinary skill in the art that variations may be applied to the articles and/or methods and in the steps or in the sequence of steps of the method described herein without departing from the concept, spirit, and scope of the present disclosure. All such similar substitutes and modifications apparent to those skilled in the art, given the present disclosure, are deemed to be within the spirit, scope, and concept of the present disclosure.

As utilized in accordance with the present disclosure, the following terms, unless otherwise indicated, shall be understood to have the following meanings.

The use of the word "a" or "an" when used in conjunction with the term "comprising" may mean "one," but it is also consistent with the meaning of "one or more," "at least one," and "one or more than one." The use of the term "or" is used to mean "and/or" unless explicitly indicated to refer to alternatives only if the alternatives are mutually exclusive, although the disclosure supports a definition that refers to only alternatives and "and/or." Throughout this application, the term "about" is used to indicate that a value includes the inherent variation of error for the quantifying device, the method being employed to determine the value, or the variation that exists among the study subjects. For example, but not by way of limitation, when the term "about" is utilized, the designated value may vary by plus or minus twelve percent, or eleven percent, or ten percent, or nine percent, or eight percent, or seven percent, or six percent, or five percent, or four percent, or three percent, or two percent, or one percent. The use of the term "at least one" will be understood to include one as well as any quantity more than one, including but not limited to, 1, 2, 3, 4, 5, 10, 15, 20, 30, 40, 50, 100, etc. The term "at least one" may extend up to 100 or 1000 or more depending on the term to which it is attached. In addition, the quantities of 100/1000 are not to be considered limiting as lower or higher limits may also produce satisfactory results. In addition, the use of the term "at least one of X, Y, and Z" will be understood to include X alone, Y alone, and Z alone, as well as any combination of X, Y, and Z. The use of ordinal number terminology (i.e., "first", "second", "third", "fourth", etc.) is solely for the purpose of differentiating between two or more items and, unless otherwise stated, is not meant to imply any sequence or order or importance to one item over another or any order of addition.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. The term "or combinations thereof" as used herein refers to all permutations and combinations of the listed items preceding the term. For example, "A, B, C, or combinations thereof" is intended to include at least one of: A, B, C, AB, AC, BC, or ABC and, if order is important in a particular context, also BA, CA, CB, CBA, BCA, ACB, BAC, or CAB. Continuing with this example, expressly included are combinations that contain repeats of one or more items or terms, such as BB, AAA, AAB, BBC, AAABCCCC, CBBAAA, CABABB, and so forth. The skilled artisan will understand that typically there is no limit on the number of items or terms in any combination, unless otherwise apparent from the context.

As used herein, the term "substantially" means that the subsequently described event or circumstance completely occurs or that the subsequently described event or circumstance occurs to a great extent or degree. For example, when associated with a particular event or circumstance, the term "substantially" means that the subsequently described event or circumstance occurs at least 80% of the time, or at least 85% of the time, or at least 90% of the time, or at least 95% of the time.

As used herein, "liquid electrophotographic printing" can be used interchangeably with "LEP printing", "electrorepro-graphic printing with liquid toner particles", or "xerographic printing with liquid toner particles"; all of which encompass, for example, HP® digital indigo printing presses and processes. Further, as used herein, liquid electrophotographic printing does not refer to or encompass the offset type printing process known as lithography and discussed in more detail in Alex Glassman, *Printing Fundamentals*, TAPPI Press, 1985, which is hereby incorporated herein in its entirety.

As will be understood by persons of ordinary skill in the art, the liquid electrophotographic printing methods disclosed herein use liquid electrophotographic printing machines, also referred to as, for example, LEP printing machines and digital LEP printers. Well-known commercial examples of LEP printing machines are HP® digital indigo printing presses, also referred to as Indigo printers or variations of such.

As used herein, the term "binder additive" can be used interchangeably with "adhesion promoter", "adhesion enhancer", and "primer".

Unless otherwise specified herein, the term "polymer", as used in the present disclosure, is a polymer composition comprising one or more different monomeric units, which can encompass, for example, copolymers and terpolymers.

The term "coating", as used herein, is a film applied to at least a portion of at least one surface of a substrate. As described in more detail herein, the "coating" comprises at least a composition comprising a binder and a binder additive but can also comprise one or more components as would be known by a person of ordinary skill in the art to be beneficial in coating a substrate (e.g., a paper substrate and/or a plastic-containing substrate) to enhance the substrate and/or the print quality of an image printed thereon. See David Saltman, et al., *Pulp & Paper Primer*, 2nd Edition, TAPPI Press (1998) at, for example but without limitation, pages 24-25, which is hereby incorporated by reference herein in its entirety.

The term "molecular weight", as used herein, means the number average molecular weight in Daltons.

Turning now to the present disclosure, certain embodiments thereof are directed to a method of enhancing the adhesion of liquid ink printed on at least a portion of at least one surface of a substrate using a digital LEP printer. Certain other embodiments of the present disclosure are directed to one or more printed products that have been produced by the presently disclosed method.

In one aspect, the present disclosure is directed to a the method of enhancing adhesion of a liquid toner to at least one surface of a substrate, comprising: (i) treating at least a portion of a substrate with a composition comprising a binder and a binder additive; and (ii) liquid electrophotographic printing an image on the treated substrate using a liquid toner. The composition comprising a binder and a binder additive is also referred to herein as a "binder additive-containing composition."

In another aspect, the present disclosure is directed to a method of enhancing adhesion of a liquid toner to at least one surface of a substrate, comprising: (i) surface treating at least a portion of at least one surface of a substrate with a composition comprising a binder and a binder additive to form a print receiving coating on at least a portion of at least one surface of the substrate; and (ii) liquid electrophotographic printing an image on at least a portion of the print receiving coating using a liquid toner.

In one embodiment, the binder additive comprises a polymer having a repeat unit, wherein the repeat unit has a localized strong, negatively charged dipole (such as a carbonyl group) and no strongly positively charged dipole. As used herein, "localized strong, negatively charged dipole" means there is in the structure of the repeat unit a functional group such as a carboxyl group and herein "strong" is defined as having a local dipole moment of great than 2 dynes, where a carbonyl group is known to have a dipole of about 2.4 dynes in magnitude, the local dipole arising from differences in electronegativity of atoms bound together. Herein, having "no strongly positively charged dipole means there is no localized dipole (such as from a hydroxyl group) that has a dipole greater than 0.8 dynes in magnitude.

The repeat unit can comprise, for example but without limitation, a carbonyl group.

In one embodiment, the binder additive comprises, consists of, or consists essentially of a polymer having at least one repeat unit comprising a tertiary amide group, wherein (i) at least one of the carbon atoms bonded to the nitrogen atom of the tertiary amide group has two or three hydrogen atoms bonded thereto, and (ii) the carbonyl group of the tertiary amide group is bonded to a —CH, —CH$_2$, or —CH$_3$ group.

In one embodiment, the binder additive comprises, consists of, or consists essentially of a polymer (i.e., a "binder additive polymer") produced from one or more monomers selected from the group consisting of vinylpyrrolidone, an oxazoline-containing monomer, N-vinyl piperidinone (also known as N-vinyl piperidone), N-vinylcaprolactam, N,N-dimethyl acrylamide, and combinations thereof.

The binder additive polymer can further comprise one or more non-ionic monomers. For example, the binder additive can comprise, consist of, or consist essentially of a polymer produced from (i) one or more monomers selected from the group consisting of vinylpyrrolidone, an oxazoline-containing monomer, N-vinyl piperidinone, N-vinylcaprolactam, N,N-dimethyl acrylamide, and combinations thereof; and (ii) one or more non-ionic monomers. As used herein, a non-ionic monomer is one that does not have an anionic or cationic functionality under the conditions of use—such as from an acrylic acid, methacrylic acid, quaternary amine containing monomers. The binder additive can further comprise one or more monomers that do not strongly lead to hydrogen bonding with the primary binder additive, that is for the purposes of the current invention that they do not lead to a strong degree of self-association of the binder polymer. For the current invention strong self-association means significant hydrogen bonding of the binder additive polymer with itself or a high degree of dipole-dipole interactions of the binder additive polymer with itself. For a discussion of interaction between monomer units in a polymer, and one polymer with another polymer or with a solvent, refer to Chapter 12 of Paul Flory's classic work "Principles of Polymer Chemistry, first published in 1953 by Cornell Press. He defined an interaction parameter that expressed "the first neighbor interaction free energy." Others have expanded greatly on the concept since Flory's work. Those familiar with the concept will recognize that the point being made here is that the polymer additives of this invention have the trait of having little self-association, on a relative basis, versus other polymers and more importantly (although not meaning to be bound by theory), they are polymers that will interact on a molecular level more strongly with the polymer of the liquid toner than with themselves.

In one embodiment, the binder additive is water-dispersible or water soluble. In another embodiment the binder additive is water soluble.

Non-limiting examples of the oxazoline-containing monomer are 2-ethyl-2-oxazoline and/or 2-methyloxazoline.

In one embodiment, the binder additive polymer comprises at least one of poly(2-ethyl-2-oxazoline) and poly(2-methyloxazoline). In another embodiment the binder additive is polymer with vinylpyrrolidone as the primary repeat unit.

The binder additive polymer can have a number average molecular weight greater than 40,000 Daltons, or greater than 80,000 Daltons, or greater than 190,000 Daltons, or greater than 450,000 Daltons, wherein the upper boundary is a molecular weight that would prevent the formation of a solution comprising the binder additive polymer, as would be recognized by a person of ordinary skill in the art.

The binder can comprise, for example but without limitation, starch, protein, poly(styrene-butadiene) latexes, acrylic latexes, and/or combinations thereof. In one embodiment, the binder is selected from the group consisting of polyvinyl alcohol, oxidized starch, cationized starch, esterified starch, enzymatically denatured starch, gelatin, casein, soybean protein, carboxy-methyl cellulose, hydroxyethyl cellulose, acrylic emulsion, vinyl acetate emulsion, vinylidene chloride emulsion, polyester emulsion, styrene-butadiene emulsion, acrylonitrile-butadiene latex, and combinations thereof. In another embodiment the binder comprises one or more starches. In another embodiment the starch is cationic. The binders must be appropriate for the application method used to apply the treatment.

The substrate can be selected from the group consisting of paper products, woven and/or non-woven fibrous materials, plastic-based materials (also referred to herein simply as "plastics"), and combinations thereof. Each of these categories of substrates is described differently below because they may present differences in the way a substrate is treated and/or the level of additive utilized. However, the polymer additive and binders that carry the additive remain the same.

For example, the substrate can be a plastic-based material including, for example but without limitation, polyolefins such as polyethylene, HDPE and LDPE, Linear low density polyethylene (LLDPE), fluted polyolefins such as fluted polyethylene available under the name COROPLAST, oriented polypropylene OPP and BOPP, oriented Nylon CPA, casted polypropylene CPP, polycarbonate, acrylonitrile-butadiene-styrene (ABS), PET, PETG, rigid vinyl, pressure sensitive vinyl, vinyl films, acrylics, top-coated and print-treated polyesters, polystyrene, polyethylene coated card stock, PVC, expanded foam PVC such as Sintra®, Celtec®, and foam board, metalized polymeric film. In addition to paper products, the substrate can be any lignocellulosic-containing material.

In one embodiment, the substrate is a paper product which can be in any orientation as would be known by a person of ordinary skill in the art, such as one or more rolls, cut sheets, and/or various shapes and configurations capable of being printed by a digital LEP printer. The substrate can also be any other substrate compatible with the LEP printing process as would be known by a person of ordinary skill in the art.

The amount of the above-described binder additive-containing composition (in particular, the binder additive) added to a substrate is dependent on the properties of the substrate. For paper substrate that will be an uncoated paper, the additive containing composition will soak into the substrate—possibly completely but at least partially; for formation of a coated paper the additive containing composition is part of a coating composition carrying fillers or pigment particles and the coating composition is applied essentially to the surface of the paper to form a layer on the paper; and finally for non-porous substrate the additive containing composition is all or part of a top layer on the surface. In all cases the additive containing composition forms an ink receiving layer to which ink comes in contact in the printing process and to which the ink must adhere.

Additionally, the method in which the binder additive-containing composition is applied to a paper product or woven and/or non-woven fibrous material in which the additive containing composition soaks substantially into the substrate can impact the amount of the composition applied to the substrate. In such cases, the amount of the binder additive-containing composition is reflected herein simply as a measurement of the binder additive added to the substrate as a weight percent of the substrate. However, for cases, such as with coated paper, where the binder additive composition does not soak into the paper, or in the case of nonporous substrates, the amount of binder additive composition is expressed as how much of it is applied to the surface and the addition level is expressed as weight per the surface area treated.

For example, the amount of binder additive added to a paper product is dependent on (i) the thickness and density of the paper product, and (ii) how the composition is distributed into/onto the paper. For example, one method of treating a paper product is by the size press treatment method, which either (a) extensively soaks the binder additive-containing composition into the paper product allowing for uniform distribution throughout the paper product, or (b) maintains the binder additive-containing composition near the surface of the paper product. For cases where the size press treatment method extensively soaks the binder additive-containing composition into the paper product, the amount of composition added thereto is measured as a weight percentage of the binder additive added to the paper product on a dry weight basis. For cases where the size press treatment method maintains the binder additive-containing composition predominately toward the surface of the paper product, the amount of the composition added is measured as the amount of binder additive added in grams per square meter of the paper product.

In one embodiment, the treated substrate is a paper product and the amount of binder additive added to the treated paper product is in a range of from about 0.02 to about 1 wt %, or from about 0.03 to about 0.5%, or from about 0.04 to about 0.25%, or from about 0.04 to about 0.1% of the paper product on a dry weight basis.

In one embodiment, the treated substrate is a paper product and the amount of binder additive on each side of the treated paper product is in a range of from about 0.0075 $g/m^2$ to about 0.375 $g/m^2$, or from 0.0115 $g/m^2$ to about 0.165 $g/m^2$, or from about 0.015 $g/m^2$ to about 0.095 $g/m^2$, or from about 0.015 $g/m^2$ to about 0.04 $g/m^2$ of the paper product on a dry weight basis.

In one embodiment, the substrate is a paper product having two main sides, wherein both main sides of the paper product are treated with the above-described binder additive-containing composition such that the total amount of binder additive added to the treated paper product is in a range of from about 0.015 $g/m^2$ to about 0.75 $g/m^2$, or from about 0.023 $g/m^2$ to about 0.33 $g/m^2$, or from about 0.03 $g/m^2$ to about 0.19 $g/m^2$, or from about 0.03 $g/m^2$ to about 0.08 $g/m^2$ of the paper product on a dry weight basis.

When the binder additive-containing composition is applied to the surface of a substrate in the form of a print receiving coating, such as in treatment of a plastic substrate or for a coated paper, the amount of the binder additive as noted above is expressed as a weight per the surface area. Furthermore, it is measured as a weight percent of the coating that is applied to at least a portion of at least one surface of the substrate. In one embodiment, the amount of binder additive in the print receiving coating on the substrate is in a range of from about 0.8 to about 50 wt %, or from about 1 to about 10 wt %, or from about 1 to about 4 wt % of the print receiving coating. When the binder additive-containing composition is added to the substrate in the form of a print receiving coating, the substrate can be a paper product, plastic-containing substrate, a woven and/or non-woven fibrous material, and/or combinations thereof. In one embodiment, the substrate is a paper product. In another embodiment, the substrate is plastic-containing substrate.

In another embodiment, the composition comprising the binder and binder additive can further comprise additional additives for enhancing the adhesion of the liquid toner printed on a substrate via LEP printing. Non-limiting examples of the additional additives include polyethylene acrylic acid and polyethylene imine.

The composition comprising the binder and binder additive can also further comprise additional additives as known in the art including, for example, fillers, defoamers, waxes, pigments, dyes, biocides, rheology modifiers, rosin derivatives, surfactants, and/or combinations thereof.

The method can further comprise crosslinking the surface treated substrates by any means known in the art, including, for example, adding UV-curable or thermal-curable monomers to the composition comprising the binder and binder additive and/or UV curing or thermally curing the surface treated substrates.

Any of the above-described embodiments can utilize any suitable method as would be known to a person of ordinary skill in the art for applying the composition comprising the binder and binder additive to a substrate that leads to a substantially uniform treatment across the surface of the substrate. Such methods include, for example but without limitation, using the size press equipment normally utilized with paper machines, spray coating, foam coating, curtain coating, roller coating, and/or combinations thereof.

Additionally, any of the above-described embodiments can be used during either the formation or treatment of the substrate, including treatment just prior to printing the liquid ink on the substrate using an LEP printer. For example, the binder additive may be applied by a coating station on the printer or even printed onto the surface.

In one aspect, the present disclosure is directed to a printed substrate produced by any one of the above-recited methods.

In another aspect, the present disclosure is directed to a printed substrate produced by any one of the above-recited LEP methods, which may further comprise one or more images printed on the substrate before and/or after the above-recited LEP methods. In one embodiment, the one or more additional images printed on the substrate can be printed using any printing method/process as would be known to a person of ordinary skill in the art, including, for example but without limitation, inkjet printing.

In one embodiment, the image on the printed substrate has an adhesion to the substrate greater than 80%, or greater than 85%, or greater than 90%, or greater than 95% as measured by the Tape Pull Test using 3M 230 tape, which is discussed in more detail further herein.

Directly Treated Substrate

In another aspect, the present disclosure is directed to a printed material comprising: (i) a substrate treated with a composition comprising a binder and a binder additive to form a treated substrate; and (ii) an image on at least a portion of one surface of the treated substrate, wherein the image is printed on the treated substrate using a liquid electrophotographic printer and a liquid toner.

In one embodiment, the binder additive comprises a polymer having a repeat unit, wherein the repeat unit has a localized strong, negatively charged dipole (such as a carbonyl group) and no strongly positively charged dipole as defined above.

The repeat unit can comprise, for example but without limitation, a carbonyl group.

In one embodiment, the binder additive comprises, consists of, or consists essentially of a polymer having at least one repeat unit comprising a tertiary amide group, wherein (i) at least one of the carbon atoms bonded to the nitrogen atom of the tertiary amide group has two or three hydrogen atoms bonded thereto, and (ii) the carbonyl group of the tertiary amide group is bonded to a —CH, —$CH_2$, or —$CH_3$ group.

In one embodiment, the binder additive comprises, consists of, or consists essentially of a polymer (i.e., a "binder additive polymer") produced from one or more monomers selected from the group consisting of vinylpyrrolidone, an oxazoline-containing monomer, N-vinyl piperidinone, N-vinylcaprolactam, N,N-dimethyl acrylamide, and combinations thereof.

The binder additive polymer can further comprise one or more non-ionic monomers. For example, the binder additive can comprise, consist of, or consist essentially of a polymer produced from (i) one or more monomers selected from the group consisting of vinylpyrrolidone, an oxazoline-containing monomer, N-vinyl piperidinone, N-vinylcaprolactam, N,N-dimethyl acrylamide, and combinations thereof; and (ii) one or more non-ionic monomers. As used herein, a non-ionic monomer is one that does not have an anionic or cationic functionality under the conditions of use—such from an acrylic acid, methacrylic acid, quaternary amine containing monomers. The binder additive can further comprise one or more monomers that do not strongly lead to hydrogen bonding with the primary binder additive, that is they do not lead to a strong degree of self-association of the binder polymer.

In one embodiment, the binder additive is water-dispersible or water soluble.

Non-limiting examples of the oxazoline-containing monomer are 2-ethyl-2-oxazoline and/or 2-methyloxazoline.

In one embodiment, the binder additive polymer comprises at least one of poly(2-ethyl-2-oxazoline) and poly(2-methyloxazoline).

The binder additive polymer can have a number average molecular weight greater than 40,000 Daltons, or greater than 80,000 Daltons, or greater than 190,000 Daltons, or greater than 490.000 Daltons, wherein the upper boundary is a molecular weight that would prevent the formation of a solution comprising the binder additive polymer, as would be recognized by a person of ordinary skill in the art.

The binder can comprise, for example but without limitation, starch, protein, poly(styrene-butadiene) latexes, acrylic latexes, and/or combinations thereof. In one embodiment, the binder is selected from the group consisting of polyvinyl alcohol, oxidized starch, cationized starch, esterified starch, enzymatically denatured starch, gelatin, casein, soybean protein, carboxy-methyl cellulose, hydroxyethyl cellulose, acrylic emulsion, vinyl acetate emulsion, vinylidene chloride emulsion, polyester emulsion, styrene-butadiene emulsion, acrylonitrile-butadiene latex, and combinations thereof. In another embodiment the binder is one or more starches and in another embodiment the binder is cationic starch.

The substrate can be selected from the group consisting of paper products, woven and/or non-woven fibrous materials, plastic-based materials, and combinations thereof. For example, the substrate can be a plastic-based material including, for example but without limitation, polyolefins such as polyethylene, HDPE and LDPE, Linear low density polyethylene (LLDPE), fluted polyolefins such as fluted polyethylene available under the name COROPLAST, oriented polypropylene OPP and BOPP, oriented Nylon CPA, casted polypropylene CPP, polycarbonate, acrylonitrile-butadiene-styrene (ABS), PET, PETG, rigid vinyl, pressure sensitive vinyl, vinyl films, acrylics, top-coated and print-treated polyesters, polystyrene, polyethylene coated card stock, PVC, expanded foam PVC such as Sintra®, Celtec®, and foam board, metalized polymeric film. In addition to paper products, the substrate can be any lignocellulosic-containing material.

In one embodiment, the substrate is a paper product which can be in any orientation as would be known by a person of ordinary skill in the art, such as one or more rolls or cut sheets, and/or various shapes and configurations capable of being printed by a digital LEP printer. The substrate can also be any other substrate compatible with the LEP printing process as would be known by a person of ordinary skill in the art.

In one embodiment, the treated substrate is a paper product and the amount of binder additive added to the treated paper product is in a range of from about 0.02 to about 1 wt %, or from about 0.03 to about 0.5%, or from about 0.04 to about 0.25%, or from about 0.04 to about 0.1% of the paper product on a dry weight basis.

In one embodiment, the treated substrate is a paper product and the amount of binder additive on each side of the treated paper product is in a range of from about 0.0075 g/m$^2$ to about 0.375 g/m$^2$, or from 0.0115 g/m$^2$ to about 0.165 g/m$^2$, or from about 0.015 g/m$^2$ to about 0.095 g/m$^2$, or from about 0.015 g/m$^2$ to about 0.04 g/m$^2$ of the paper product on a dry weight basis In one embodiment, the substrate is a paper product having two main sides, wherein both main sides of the paper product are treated with the above-described binder additive-containing composition such that the total amount of binder additive added to the treated paper product is in a range of from about 0.015 g/m$^2$ to about 0.75 g/m$^2$, or from about 0.023 g/m$^2$ to about 0.33 g/m$^2$, or from about 0.03 g/m$^2$ to about 0.19 g/m$^2$, or form about 0.03 g/m$^2$ to about 0.08 g/m$^2$ of the paper product on a dry weight basis.

The image on the substrate of the printed material has an adhesion to the substrate greater than 80%, or greater than 85%, or greater than 90%, or greater than 95% as measured by the Tape Pull Test using 3M 230 tape, which is discussed in more detail further herein.

Surface Treated Substrate Comprising a Print Receiving Coating Thereon

In another aspect, the present disclosure is directed to a printed material comprising: (i) a surface treated substrate comprising a print receiving coating on at least a portion of at least one surface of a substrate, wherein the print receiving coating comprises (a) a binder and (b) a binder additive; and (ii) an image on at least a portion of the print receiving coating, wherein the image is printed on the print receiving coating using a liquid electrophotographic printer and a liquid toner.

In one embodiment, the binder additive comprises a polymer having one or more repeat units, wherein the one or more repeat units have a localized strong, negatively charged dipole and a localized weak, positively charged dipole. In one embodiment, the binder additive comprises a polymer having one or more repeat units, wherein the one or more repeat units has a localized strong, negatively charged dipole (such as a carbonyl group) and no strongly positively charged dipole as defined above.

The repeat unit can comprise, for example but without limitation, a carbonyl group.

In one embodiment, the binder additive comprises, consists of, or consists essentially of a polymer having at least one repeat unit comprising a tertiary amide group, wherein (i) at least one of the carbon atoms bonded to the nitrogen atom of the tertiary amide group has two or three hydrogen atoms bonded thereto, and (ii) the carbonyl group of the tertiary amide group is bonded to a —CH, —CH$_2$, or —CH$_3$ group.

In one embodiment, the binder additive comprises, consists of, or consists essentially of a polymer (i.e., a "binder additive polymer") produced from one or more monomers selected from the group consisting of vinylpyrrolidone, an oxazoline-containing monomer, N-vinyl piperidinone, N-vinylcaprolactam, N,N-dimethyl acrylamide, and combinations thereof.

The binder additive polymer can further comprise one or more non-ionic monomers. For example, the binder additive can comprise, consist of, or consist essentially of a polymer produced from (i) one or more monomers selected from the group consisting of vinylpyrrolidone, an oxazoline-containing monomer, N-vinyl piperidinone, N-vinylcaprolactam, N,N-dimethyl acrylamide, and combinations thereof; and (ii) one or more non-ionic monomers. As used herein, a non-ionic monomer is one that does not have an anionic or cationic functionality under the conditions of use—such from an acrylic acid, methacrylic acid, quaternary amine containing monomers. The binder additive can further comprise one or more monomers that do not strongly lead to hydrogen bonding with the primary binder additive, that is they do not lead to a strong degree of self-association of the binder polymer.

In one embodiment, the binder additive is water-dispersible or water soluble.

Non-limiting examples of the oxazoline-containing monomer are 2-ethyl-2-oxazoline and/or 2-methyloxazoline.

In one embodiment, the binder additive polymer comprises at least one of poly(2-ethyl-2-oxazoline) and poly(2-methyloxazoline).

The binder additive polymer can have a number average molecular weight greater than 40,000 Daltons, or greater than 80,000 Daltons, or greater than 190,000 Daltons, or greater than 490.000 Daltons, wherein the upper boundary is a molecular weight that would prevent the formation of a solution comprising the binder additive polymer, as would be recognized by a person of ordinary skill in the art.

The binder can comprise, for example but without limitation, starch, protein, poly(styrene-butadiene) latexes, acrylic latexes, and/or combinations thereof. In one embodiment, the binder is selected from the group consisting of polyvinyl alcohol, oxidized starch, cationized starch, esterified starch, enzymatically denatured starch, gelatin, casein, soybean protein, carboxy-methyl cellulose, hydroxyethyl cellulose, acrylic emulsion, vinyl acetate emulsion, vinylidene chloride emulsion, polyester emulsion, styrene-butadiene emulsion, acrylonitrile-butadiene latex, and combinations thereof. In another embodiment the binder is one or more starches. In another embodiment the binder is cationic starch.

The substrate can be selected from the group consisting of paper products, woven and/or non-woven fibrous materials, plastic-based materials, and combinations thereof. For example, the substrate can be a plastic-based material including, for example but without limitation, polyolefins such as polyethylene, HDPE and LDPE, Linear low density polyethylene (LLDPE), fluted polyolefins such as fluted polyethylene available under the name COROPLAST, oriented polypropylene OPP and BOPP, oriented Nylon CPA, casted polypropylene CPP, polycarbonate, acrylonitrile-butadiene-styrene (ABS), PET, PETG, rigid vinyl, pressure sensitive vinyl, vinyl films, acrylics, top-coated and print-treated polyesters, polystyrene, polyethylene coated card stock, PVC, expanded foam PVC such as Sintra®, Celtec®, and foam board, metalized polymeric film. In addition to paper products, the substrate can be any lignocellulosic-containing material.

In one embodiment, the substrate is a paper product which can be in any orientation as would be known by a person of ordinary skill in the art, such as one or more rolls, cut sheets, and/or various shapes and configurations capable of being printed by a digital LEP printer. The substrate can also be any other substrate compatible with the LEP printing process as would be known by a person of ordinary skill in the art.

In one embodiment, the amount of binder additive in the print receiving coating on the substrate is in a range of from about 0.8 to about 50 wt %, or from about 1 to about 10 wt %, or from about 1 to about 4 wt % of the print receiving coating. The substrate can be a paper product, plastic-containing substrate, a woven and/or non-woven fibrous material, and/or combinations thereof when the binder additive-containing composition is added to the substrate in the form of a print receiving coating. In one embodiment, the substrate is a paper product. In another embodiment, the substrate is plastic-containing substrate.

In another embodiment, the composition comprising the binder and binder additive can further comprise additional additives for enhancing the adhesion of the liquid toner printed on a substrate via LEP printing. Non-limiting examples of the additional additives include polyethylene acrylic acid and polyethylene imine.

The composition comprising the binder and binder additive can also further comprise additional additives known in the art including, for example, fillers, defoamers, waxes, pigments, dyes, biocides, rheology modifiers, rosin derivatives, surfactants, and/or combinations thereof.

The image on the substrate of the printed material has an adhesion to the substrate greater than 80%, or greater than 85%, or greater than 90%, or greater than 95% as measured by the Tape Pull Test using 3M 230 tape.

EXAMPLES

The following examples illustrate the enhanced adhesion of liquid toner LEP printed on a substrate as disclosed herein compared to the adhesion of LEP ink to substrates previously known in the prior art. These examples are merely illustrative of the present disclosure and are not to be construed as limiting the present disclosure to the particular compounds, processes, conditions, or applications disclosed therein.

Test Method for Measuring Adhesion

The test method used was the standard method for determining adhesion of HP® digital Indigo™ printed images to substrates as defined by HP for qualification of paper for their Indigo presses. More specifically, black rectangle images of 100% black liquid toner were printed using an HP® Indigo 5500 printer in a 4 shot mode using standard temperature settings to provide the test pattern. Black rectangular images were also printed using the same printer and settings but the black liquid toner was composed of 52 parts yellow, 66 parts magenta, 72 parts cyan, and 100 parts black toner, which are commonly referred to as 290% photoimages. The latter test is the more severe test.

Ten minutes after printing the above-described images, the images were tested for adhesion to a substrate with a tape test using 3M™ 230 tape and a weighted roller to uniformly and consistently apply force. The percent of the image not removed by peeling off the tape was measured.

The tests were performed by the Rochester Institute of Technology (the North American test site for qualifying paper treatments for indigo printing) in compliance with the standard test procedures set forth by HP for testing the adhesion of ink coated with one of their Indigo printing presses. For these tests, the HP® Indigo press 5500 was used.

Example 1

A roll of uncoated fine paper suitable for printing was premade. The paper had a basis weight of 90 g/m$^2$ and was made with pulp of approximately a 50:50 blend of hard wood and soft wood, with a portion being pulped by a craft process and a portion by a sulfite process. It was not size press treated at the time it was made. It had a Sheffield Smoothness of 82 and a Gurley porosity of 30 sec/100 cc. The paper was post treated with a Dixon coater. A solution of 13.9% oxidized starch (Grain Process Corporation D28F) was prepared by a standard starch process by cooking a batch of starch to dissolve it. After cooking, the starch was kept between 55 and 70° C. and to it was added the various binder additives. The binder additives were added as water based solutions or dispersions. The total amount of the starch-binder additive mixtures applied to the paper was such that there was 4% total added on a dry basis to dry paper weight. The Dixon coater was run such that the paper passed through rollers containing a puddle of the starch mixture, and both sides of the paper were equally treated and treatment penetrated into the paper. The paper was then dried, rolled, and later cut to size for printing and adhesion testing. The level of binder additive added to the starch was adjusted to give the desired level of treatment of the paper.

The following table listed the binder additives and their amounts applied to the paper along with the results of testing of adhesion of black print, and also a combination of inks to give 290% photo images as described above, applied by an Indigo printer The poly(ethylene/acrylic) polymer with 20 mole % acrylic acid is commercially available from Sigma-Aldrich (St. Louis, Mo.) and was prepared by mixing 25 g of the poly(ethylene/acrylic) polymer with 175 g water and 15.2 g concentrated ammonium hydroxide while stirring. The mixture was covered and stirred at 90° C. for 8 hours. The poly(2-ethyl-2-oxazoline) had an average molecular weight of 50,000 Daltons and is commercially available from Sigma-Aldrich (St. Louis, Mo.).

TABLE 1

| Binder Additive | Amount of Binder Additive (% wt. based on dry weight of paper) | Indigo Black Adhesion (% adhered) | Indigo 290% Photo Adhesion (% adhered) |
| --- | --- | --- | --- |
| No Binder or Binder Additive | 0 | 73 | 55 |
| Starch Only - No Binder Additive | 0 | 68 | 56 |
| Poly(ethylene/acrylic acid) | 0.2 | 67 | 53 |
| Poly(2-ethyl-2-oxazoline) | 0.2 | 99 | 96 |

As can be seen in Table 1, the composition comprising 0.2 wt % starch and poly(2-ethyl-2-oxazoline) on the paper had a significantly better adhesion of the liquid toner to the paper than the other binder additives. Although poly(ethylene/acrylic acid) has been used to improve the adhesion of LEP printed images, it is clear that the composition comprising a binder, for example starch, and poly(2-ethyl-2-oxazoline) leads to a large improvement in the adhesion of the LEP toner to the substrate.

Example 2

The same base paper used in Example 1 was also used for Example 2. The paper was treated on a Dixon coater in the same manner as in Example 1. The starch solution was 12.5% GPC D28F oxidized starch. The total amount of treatment applied in each experiment was 4% on a dry weight basis of the dry paper weight. The poly(2-ethyl-2-oxazoline) binder additive again had an average molecular weight of 50,000 and is commercially available from Sigma-Aldrich (St. Louis, Mo.)

TABLE 2

| Binder Additive | Amount of Binder Additive (% wt. based on dry weight of paper) | Indigo Black Adhesion (% adhered) | Indigo 290% Photo Adhesion (% adhered) |
| --- | --- | --- | --- |
| Starch Only - No Binder Additive | 0 | 78 | 57 |
| Poly (2-ethyl-2-oxazoline) | 0.05 | 97 | 91 |
| Poly (2-ethyl-2-oxazoline) | 0.1 | 97 | 96 |
| Poly (2-ethyl-2-oxazoline) | 0.2 | 98 | 98 |

As can be seen in Table 2, the oxazoline monomer-based primer was effective at giving much improved adhesion of images from the Indigo printer toner and that even a level of 0.05% was very effective.

Example 3

The same base paper used in Example 1 was also used in Example 3. The paper was treated on a Dixon coater in the same manner as in Example 1. The starch solution was 12.5% GPC D28F oxidized starch. The total amount of treatment applied in each experiment was 4% on a dry weight basis of the dry paper weight.

Table 3 shows the type of binder additive, the amount of binder additive applied with the starch (as described above), and the adhesion of LEP printed images. Four different molecular weights of poly(2-ethyl-2-oxazoline) were tested (as indicated in Table 3) at various weight percents. In addition polyvinylpyrrolidone of an average molecular weight of 360,000 was tested. Also tested was a poly(ethylene imine) of an average molecular weight of 50,000.

TABLE 3

| Binder Additive | Amount of Binder Additive (% wt. based on dry weight of paper) | Indigo Black Adhesion (% adhered) | Indigo 290% Photo Adhesion (% adhered) |
| --- | --- | --- | --- |
| Starch Only - No Binder Additive | 0 | 81 | 69 |
| Poly(2-ethyl-2-oxazoline) MW 5,000 Daltons | 0.05 | 96 | 86 |
| Poly(2-ethyl-2-oxazoline) MW 50,000 Daltons | 0.05 | 97 | 90 |
| Poly(2-ethyl-2-oxazoline) MW 200,000 Daltons | 0.05 | 98 | 93 |
| Poly(2-ethyl-2-oxazoline) MW 500,000 Daltons | 0.05 | 97 | 91 |
| Poly(2-ethyl-2-oxazoline) MW 5,000 Daltons | 0.1 | 97 | 90 |
| Poly(2-ethyl-2-oxazoline) MW 50,000 Daltons | 0.1 | 97 | 92 |
| Poly(2-ethyl-2-oxazoline) MW 200,000 Daltons | 0.1 | 98 | 96 |
| Poly(2-ethyl-2-oxazoline) MW 500,000 | 0.1 | 98 | 97 |
| Poly(2-ethyl-2-oxazoline) MW 200,000 | 0.4 | 98 | 99 |
| Poly(vinyl pyrrolindone) | 0.2 | 98 | 98 |
| Poly(ethylene imine) | 0.2 | 93 | 87 |

As illustrated in Table 3, the oxazoline monomer-based binder additive is effective at giving much improved adhesion of images from the LEP printer toner and that even a level of 0.05% was very effective. A molecular weight of 50,000 Daltons was more effective than a molecular weight of 5,000 Daltons. Likewise, molecular weights of 200,000

Daltons and 500,000 Daltons were more effective than the material having a molecular weight of 50,000 Daltons. It can also be concluded that, strictly on an adhesion basis, that increasing amounts of the poly(2-ethyl-2-oxazoline) binder additive led to improved adhesion. Polyvinylpyrrolidone at a level of 0.2% was very effective at enhancing adhesion. Both the poly(2-ethyl-2-oxazoline) and the polyvinylpyrrolidone were far more effective than poly(ethylene imine) a known polymer for improving the adhesion of images produced by an LEP printer.

Example 4

The same base paper used in Example 1 was also used in Example 4. The paper was treated on a Dixon coater in the same manner as in Example 1. The starch solution was 12.7% GPC D28F oxidized starch. The total amount of treatment applied in each experiment was 4% on a dry weight basis of the dry paper weight.

Table 4 shows the type of binder additive, the amount of binder additive applied with the starch (as described above), and the adhesion of LEP printed images. Three different ethyl oxazoline polymers were tested. The first was the same as used in Examples 1 to 3, i.e., poly(2-ethyl-2-oxazoline) with a molecular weight of 50,000 Daltons. The second was a random copolymer comprising 94 mole % ethyl oxazoline monomer and 6 mole % of phenyl oxazoline monomer. The third was a block copolymer comprising 94 mole % ethyl oxazoline monomer and 6 mole % of the phenyl oxazoline monomer.

TABLE 4

| Binder Additive | Amount of Binder Additive (% wt. based on dry weight of paper) | Indigo Black Adhesion (% adhered) | Indigo 290% Photo Adhesion (% adhered) |
|---|---|---|---|
| Starch Only - No Binder Additive | 0 | 86 | 77 |
| Poly(2-ethyl-2-oxazoline) MW 50,000 Daltons | 0.2 | 99 | 99 |
| Random Copolymer of Poly(ethyl/phenyl oxazoline) | 0.2 | 98 | 98 |
| Block Copolymer of Poly(ethyl/phenyl oxazoline) | 0.2 | 99 | 99 |

As illustrated in Table 4, both poly(2-ethyl-2-oxazoline) and copolymer with predominantly the same monomer, are very effective at providing adhesion of the liquid toner to the substrate as applied by an LEP printer.

Thus, in accordance with the present disclosure, set forth herein is a method of enhancing adhesion of a liquid toner to at least one surface of a substrate, comprising: (i) surface treating the at least one surface of the substrate with a composition comprising (a) a binder and (b) a binder additive, and (ii) liquid electrophotographic printing an image on the at least one treated surface of the substrate using a liquid ink, as well as a printed substrate produced by such a method. Although the present disclosure has been described in conjunction with the specific language set forth herein above, it is evident that many alternatives, modifications, and variations will be apparent to those skilled in the art. Accordingly, it is intended to embrace all such alternatives, modifications, and variations that fall within the spirit and broad scope of the present disclosure. Changes may be made in the construction and the operation of the various components, elements, and assemblies described herein, as well as in the steps or the sequence of steps of the methods described herein, without departing from the spirit and scope of the present disclosure.

Example 5

A process similar to example 4 was utilized where paper was treated with a Dixon Coater in a puddle size press configuration. The base paper was a commercial paper made without size press treatment, with internal sizing from alkyl succinic anhydride, and about 25% precipitated calcium carbonate filler. The cooked starch used in the treatment on the Dixon coater was Ethyex 2015 or Catosize 270A. Starch solids were adjusted to give approximately 3.5% dry starch weight in the final paper weight. As with above examples the treatment additives to enhance adhesion of Indigo printer ink were added to the starch solutions used to treat the paper. The levels used were adjusted based on the pick-up of the starch solution. The starches used to treat the paper were below 55° C. at the time of treatment. This base paper had a more open structured sheet than previous base sheets tested. The base paper had a Gurley porosity of 14.6 after treatment with just the starch. It had a level of sizing (water hold-out) as measured by the Hercules Sizing Test of 10 seconds when just starch was applied.

Table 5 shows the type of starch and type of binder additive, the amount of binder additive applied with the starch (as described above), and the adhesion of LEP printed images. As with the above examples the finished paper were cut and submitted to RIT for evaluation of adhesion using an Indigo Printer.

TABLE 5

| Binder Additive | Starch Type | Amount of Binder Additive (% wt. based on dry weight of paper) | Indigo Black Adhesion (% adhered) | Indigo 290% Photo Adhesion (% adhered) |
|---|---|---|---|---|
| Starch Only - No Binder Additive | Ethylated | 0 | 88 | 70 |
| Poly(2-ethyl-2-oxazoline) MW 500,000 Daltons | Ethylated | 0.1 | 95 | 90 |
| Poly(2-ethyl-2-oxazoline) MW 500,000 Daltons | Ethylated | 0.3 | 95 | 92 |
| Poly(2-ethyl-2-oxazoline) MW 500,000 Daltons | Ethylated | 0.6 | 95 | 96 |
| Poly(2-ethyl-2-oxazoline) MW 500,000 Daltons | Ethylated | 1.0 | 99 | 98 |

TABLE 5-continued

| Binder Additive | Starch Type | Amount of Binder Additive (% wt. based on dry weight of paper) | Indigo Black Adhesion (% adhered) | Indigo 290% Photo Adhesion (% adhered) |
|---|---|---|---|---|
| Polyvinylpyrrolidone MW 360,000 Dalton | Ethylated | 0.1 | 92 | 86 |
| 1) Polyvinylalcohol and 2) Polyethyloxazline | Ethylated | 1) 0.2 and 2) 0.1 | 93 | 86 |
| Poly(ethyloxazoline/ethylene imine) | Ethylated | 0.3 | 92 | 90 |
| Poly(2-ethyl-2-oxazoline) MW 500,000 Daltons | Cationic | 0.3 | 98 | 98 |

As in previous examples the addition of Poly(2-ethyloxazoline) (PEO), provided improved adhesion of the Indigo printer images, as did polyvinylpyrrolidone. A copolymer of PEO and ethylene imine with secondary amines also gave improved adhesion as did a blend of polyvinylalcohol and PEO. The improvement was not as large with the base sheet used in this work, possibly because of its more open structure. However use of PEO with cationic starch gave greater adhesion on this base sheet than obtained with the ethylated starch.

Example 6

With a set of experiments similar to Example 5, paper was treated with 500,000 average molecular weight PEO as the binder additive and using ethylated starch as the binder. Additives that improve paper strength were also included with the starch binder and PEO binder additive. In addition two additional binders of cationic starch were included with the ethylated starch binder and the PEO. The effect of the PEO and the PEO combined with the other ingredients on adhesion of printed inks from an Indigo™ printer is summarized in Table 6.

As with the above examples the finished papers were cut and submitted to RIT for evaluation of adhesion using an Indigo Printer.

TABLE 6

| Additive | Amount of Additive (% wt. based on dry weight of paper) | Indigo Black Adhesion (% adhered) | Indigo 290% Photo Adhesion (% adhered) |
|---|---|---|---|
| Starch Only - No PEO | 0 | 80 | 64 |
| Just PEO and starch | 0 | 96 | 93 |
| Poly(acrylamide/ acrylic acid) | 0.3 | 98 | 91 |
| Polyamidoamine-epichlorohydrin resin | 0.3 | 97 | 92 |
| Cationic starch #1 | 0.6 | 98 | 96 |
| Cationic starch #2 | 0.6 | 98 | 96 |

All samples in table 6 were treated with a combination of ethylated starch and PEO to give about 3.5% starch and 0.3% PEO on the final dry paper on a dry wt. % basis.

As in previous examples the addition of Poly(2-ethyloxazoline) (PEO), provided improved adhesion of the Indigo printer images over the addition of just starch. Two different additives that would improve the starch strength and/or the surface strength of the paper were added: 1) Poly(acrylamide/acrylic acid) available as Solenis' Hercobond™ 2800 and 2) a polyamidoamine epichlorohydrin resin (PAE resin) which is the most common type of paper wet strength additives and available from Solenis as Kymene™ 920. These strength additives did not detract significantly from the adhesion of the HP Indigo™ printer images.

Addition of two different cationic starches as additional binders with the ethylated starch and PEO improved the performance of the PEO. The two cationic starches added were highly cationic waxy maize starches available as Topcat™ L95 and Topcat™ L98 from Ingredion Inc. of Westchester, Ill.

What is claimed is:

1. A method of enhancing adhesion of an image to at least one surface of a substrate where the image was from an electrophotographic printer utilizing liquid toner technology and the image was based on a liquid toner, the method, comprising treating at least a portion of a substrate prior to printing with a composition comprising a water soluble or water dispersible binder and a water soluble or water dispersible binder additive, wherein the binder additive comprises a polymer comprising one or more repeat units, wherein the one or more repeat units has a localized strong, negatively charged dipole and no strongly positively charged dipole;

wherein the binder additive comprises a polymer produced from one or more monomers selected from the group consisting of vinylpyrrolidone, an oxazoline-containing monomer, N-vinyl piperidinone, vinylcaprolactam, N,N-dimethyl acrylamide, and combinations thereof and (ii) optionally one or more non-ionic monomers or optionally (iii) one or more non-hydrogen bonding monomers, provided the binder additive comprises one or more oxazoline-containing monomers selected from the group consisting of 2-ethyl-2-oxazoline, 2-methyloxazoline, and combinations thereof.

2. The method of claim 1, wherein the polymer is selected from the group consisting of poly(2-ethyl-2-oxazoline), poly(2-methyloxazoline), or polyvinylpyrrolidone.

3. The method of claim 1, wherein the polymer has a number average molecular weight greater than 40,000 Daltons.

4. The method of claim 1, wherein the binder is selected from the group consisting of polyvinyl alcohol, oxidized starch, cationized starch, esterified starch, enzymatically denatured starch, gelatin, casein, soybean protein, carboxymethyl cellulose, hydroxyethyl cellulose, acrylic emulsion, vinyl acetate emulsion, vinylidene chloride emulsion, polyester emulsion, styrene-butadiene emulsion, acrylonitrile-butadiene latex, and combinations thereof.

5. The method of claim 1, wherein the binder comprises a water soluble hydroxyl-group containing polymer.

6. The method of claim 1, wherein the substrate is selected from the group consisting of paper products, a woven fibrous material, non-woven fibrous material, plastic, and combinations thereof.

7. The method of claim 1, wherein the liquid toner comprises a suspension of pigment or pigment containing particles in a nonaqueous liquid.

8. A printed substrate produced by the method of claim 1.

9. The printed substrate of claim 8, wherein the substrate is a paper product.

10. The printed substrate of claim 9, wherein the paper product is uncoated.

11. The printed substrate of claim 9, wherein the amount of binder additive on each treated side of the paper product is in a range of from about 0.0075 to about 0.375 g/m.sup.2 of the paper on a dry weight basis.

12. The printed substrate of claim 9, wherein the amount of binder additive on the paper product is in a range of from about 0.02 to about 1 wt % of the paper product on a dry weight basis.

13. The printed substrate of claim 8, wherein the image has an adhesion to the substrate of greater than 90% as measured by the Tape Pull Test using 3M 230 tape.

14. A method of enhancing adhesion of a liquid toner based image to at least one surface of a substrate, comprising: (a) surface treating at least a portion of at least one surface of a substrate with a composition comprising a binder and a binder additive to form a print receiving coating on at least a portion of the at least one surface of the substrate; and (b) liquid electrophotographic printing an image on at least a portion of the print receiving coating using a liquid toner; wherein the binder additive comprises a polymer comprising one or more repeat units, wherein the one or more repeat units has a localized strong, negatively charged dipole and no strongly positively charged dipole;

wherein the binder is selected from the group consisting of polyvinyl alcohol, oxidized starch, cationized starch, esterified starch, enzymatically denatured starch, gelatin, casein, soybean protein, carboxy-methyl cellulose, hydroxyethyl cellulose, acrylic emulsion, vinyl acetate emulsion, vinylidene chloride emulsion, polyester emulsion, styrene-butadiene emulsion, acrylonitrile-butadiene latex, and combinations thereof; and wherein the binder additive comprises a polymer produced from one or more monomers selected from the group consisting of vinylpyrrolidone, an oxazoline-containing monomer, N-vinyl piperidinone, vinyl-caprolactam, N,N-dimethyl acrylamide, and combinations thereof and (ii) optionally one or more non-ionic monomers or optionally (iii) one or more non-hydrogen bonding monomers, provided the binder additive comprises one or more oxazoline-containing monomers selected from the group consisting of 2-ethyl-2-oxazoline, 2-methyloxazoline, and combinations thereof.

15. A printed material, comprising: (a) a treated substrate comprising a substrate treated with a composition comprising a binder and a binder additive to form a treated substrate, and (b) an image on at least a portion of one surface of the treated substrate, wherein the image is printed on the treated substrate using a liquid electrophotographic printer and a liquid toner; wherein the binder additive comprises a polymer comprising one or more repeat units, wherein the one or more repeat units has a localized strong, negatively charged dipole and no strongly positively charged dipole;

wherein the binder additive comprises a polymer produced from one or more monomers selected from the group consisting of vinylpyrrolidone, an oxazoline-containing monomer, N-vinyl piperidinone, vinyl-caprolactam, N,N-dimethyl acrylamide, and combinations thereof and (ii) optionally one or more non-ionic monomers or optionally (iii) one or more non-hydrogen bonding monomers, provided the binder additive comprises one or more oxazoline-containing monomers selected from the group consisting of 2-ethyl-2-oxazoline, 2-methyloxazoline, and combinations thereof.

16. The printed material of claim 15, wherein the treatment comprises a surface treatment of the composition on at least a portion of at least one side of a substrate.

* * * * *